United States Patent Office 3,419,035
Patented Dec. 31, 1968

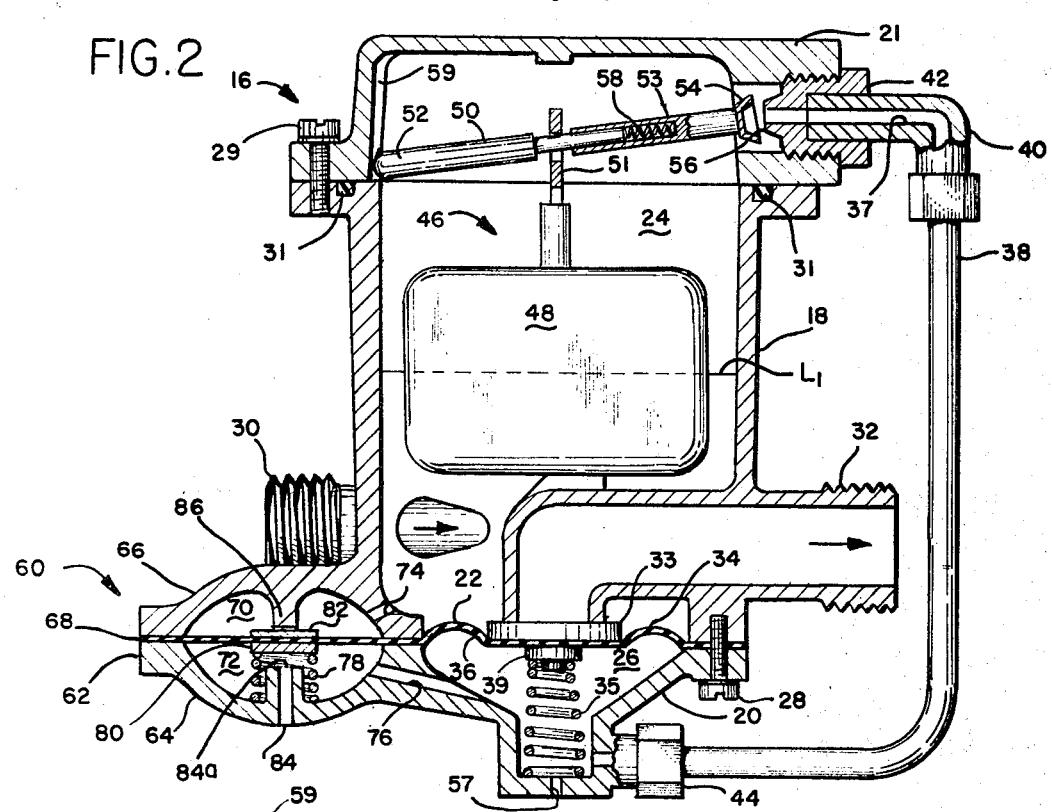

3,419,035
AIR ELIMINATION DEVICE FOR LIQUID TRANSPORT SYSTEM
Marvin E. Hartz, Milwaukee, Wis., assignor to Badger Meter Manufacturing Company, Milwaukee, Wis., a corporation of Wisconsin
Filed May 25, 1965, Ser. No. 458,700
9 Claims. (Cl. 137—174)

ABSTRACT OF THE DISCLOSURE

This disclosure relates to an eliminator which will pass system flow to a suitable metering device while exhausting air, or other unwanted media, from the system prior to passage through the metering device. A valve arrangement is provided which interrupts system flow in response to the presence of a predetermined quantity of air in the system and prevents continuance of system flow until the air has been adequately exhausted. The valve arrangement is supported in the main eliminator housing. In accordance with a further aspect of this disclosure, a high speed exhaust valve arrangement is included which becomes operative when the amount of air to be exhausted is greater than can be readily handled by the normal exhaust provisions. The high speed exhaust valve arrangement responds to the buildup in pressure at the normal exhaust which occurs when a greater than normal amount of air is to be exhausted.

---

This invention relates to arrangements for metering flow through liquid transportation systems such as pipe lines and the like and, more particularly, to apparatus for separating an unwanted medium, such as air, from the primary liquid of the system prior to metering.

In liquid transportation systems a condition which is most commonly encountered is the entrainment of pockets of air, or other media, in the flowing primary liquid. If the quantity of liquid being transported is to be metered, the presence of such air pockets in the flowing liquid will introduce an error in the liquid measurement. For convenience this invention will be discussed as an air eliminator intended to separate air from the primary liquid and prevent air passage through the meter, however, it should be appreciated that this invention is not limited to air elimination but can be used to separate other unwanted media from the primary liquid, for example, a liquid which is immiscible with the primary fluid.

Accordingly, a general object of this invention is to provide apparatus which insures passage of only the primary liquid through the meter to achieve an accurate totalization of the flow of primary liquid.

A more specific object of this invention is to provide apparatus which will eliminate air pockets and the like from the flowing liquid before the liquid passes through a meter.

A further, specific object of this invention is to provide apparatus which will rapidly exhaust unduly large quantities of air from the system while maintaining effective control over normal elimination and flow; and to accomplish this object with an arrangement which has universal applicability to liquid transportation systems.

For the achievement of these and other objects, this invention proposes an eliminator construction which can be connected in a liquid flow system upstream of a suitable metering device and is adapted to pass system flow and exhaust air or other unwanted media from the system. The eliminator includes a valve arrangement which is effective, in response to the presence of a predetermined quantity of air in the primary liquid, to close the eliminator to system flow and vent the air from the system. In this condition system flow is interrupted while air in the system is being exhausted to insure against air passing through the system to the metering device. When no air is present, or at the most is present in an insignificant amount, the eliminator is open and freely passes system flow.

The eliminator constructed in accordance with this invention includes a high speed air exhaust valve in order to effectively exhaust large amounts of air which may be present in the system, e.g., upon startup where a length of system pipe may have to be pumped out prior to initiation of primary liquid flow. Preferably, this high speed exhaust valve does not operate on the basis of internal system pressure so that it is equally well adapted to use in any system without having to be either adjusted or modified.

Other objects and advantages will be pointed out in, or be apparent from, the description and claims, as will obvious modifications of the single embodiment shown in the drawings, in which:

FIG. 1 is a schematic illustration of a typical installation for an air eliminator constructed in accordance with this invention;

FIG. 2 is a partial sectional view through the air eliminator illustrating the eliminator when it is closed to system flow and is exhausting air from the system; and FIG. 3 is a similar sectional view of the air eliminator illustrating the eliminator when it is open to system flow.

The occurrence of air pockets in a flowing fluid is perhaps most apt to occur in an installation where liquid is pumped by displacement to completely empty either a system or vessel. Therefore, the air eliminator is schematically illustrated in FIG. 1 as connected in such an installation but, as was discussed above, the air eliminator of this invention is applicable to liquid transportation systems in general. More particularly, liquid is removed from vessel 10 and propelled through pipe line 11 by pump 12 of suitable well-known construction. Liquid is measured by metering apparatus 14 which is connected in the pipe line and again can be of any suitable, well-known construction. To prevent any air entrained in the liquid from passing through the meter and creating an erroneous measurement, air eliminator 16 is positioned immediately upstream of the meter. With this arrangement only liquid flows through the meter and an accurate measurement of the quantity of liquid delivered from vessel 10 is achieved.

The structure of the air eliminator will be described with particular reference being made to FIGS. 2 and 3. The housing of the air eliminator is formed by central body portion 18 and lower bonnet 20 and cap 21 arranged at opposite ends of central portion 18. Flexible diaphragm 22 divides the interior of the air eliminator housing into first and second chambers 24 and 26. The peripheral edge of diaphragm 22 is clamped between bonnet 20 and central portion 18 by mounting screws 28 which also connect bonnet 20 to central portion 18. Similarly, cap 21 is connected to body portion 18 by a number of screws 29 with gasket 31 being provided at the juncture between the cap and body portion to provide a sealed joint.

Spuds 30 and 32 define inlet and outlet openings, respectively, for chamber 24. Valve 33 is connected to face 34 of diaphragm 22 and, in a manner to be described more completely hereinafter, is arranged for movement to selectively engage valve seat 27 to open and close outlet 32 in accordance with movement of diaphragm 22. As schematically illustrated in FIG. 1, spuds 30 and 32 are adapted for connection in pipe line 11 so that liquid flowing from vessel 10 to meter 14 is directed through air eliminator chamber 24 and valve 33 is operative selectively to permit or interrupt liquid flow through the air eliminator to the meter.

In accordance with this invention, the opening and closing of valve 33 is controlled in accordance with the state of the medium entering chamber 24, i.e., whether liquid or air is entering that chamber. In the illustrated preferred embodiment, face 34 of diaphragm 22 is exposed to chamber 24 and the opposite diaphragm face 36 is exposed to chamber 26. Compression spring 35 is seated between bonnet 20 and valve mounting connector 39 on the diaphragm and normally biases valve 33 toward a position closed on seat 27 to close outlet 32. In the preferred construction an arrangement is used which generally equalizes the pressures in chambers 24 and 26 so that the force resulting from the pressure acting on larger exposed face 36 of the diaphragm together with the force of spring 35 is greater than and overcomes the force resulting from substantially the same pressure acting on the relatively smaller face 34 thereby holding valve 33 in its closed position. More particularly, chamber 26 is connected to chamber 24 through passage 37 formed by a hollow conduit 38 communicating with chamber 24 through coupling 40 and nipple 42 and with chamber 26 through coupling 44. When passage 37 is open, chambers 24 and 26 are conversant through the passage and the pressures in the chambers tend to equalize.

A valve control mechanism 46 is sensitive to the presence of air and liquid in chamber 24 and controls the opening and closing of the passage 37 connecting chambers 24 and 26. Control means 46 includes float member 48 connected to a two-piece valve stem 50 by link 51. Valve stem 50 includes relatively movable telescoping elements 52 and 53 with the latter carrying valve member 54 at its free end. Valve member 54 is positioned adjacent a conical valve seat 56 and is movable, in accordance with float movement, into and out of engagement with the conical valve seat to open and close the passage connecting chambers 24 and 26.

When chamber 24 is filled with air, indicating a condition of either no flow through pump 12 or air passing through the system and entering chamber 24, float 48 assumes the position illustrated in FIG. 2 and valve 54 is out of engagement with valve seat 56. With passage 37 open the pressures in chambers 24 and 26 tend to equalize so that outlet 32 is closed by valve 33 thereby preventing air flow through the air eliminator to meter 14. Air contained in or entering chamber 24 is vented to atmosphere through vent opening 57 in bonnet 20.

As long as air is passing through the pipe line and entering chamber 24 the air eliminator maintains the position illustrated in FIG. 2, namely to interrupt system flow and exhaust air from the system. Thus, as an air pocket in the pipe line enters the air separator system flow to the meter is interrupted preventing the occurrence of an erroneous totalization in the meter. Assuming the air pocket to have been exhausted and that liquid begins to enter chamber 24 through inlet 30, the liquid rises in chamber 24 and float 48 becomes buoyant and rises with the liquid level. As float 48 rises it moves valve 54 toward seat 56 and, at a predetermined liquid level L (the dotted line in FIG. 3) valve 54 closes on the valve seat to close passage 37. Movement of stem 50 is guided at its left end by groove 59 in cap 21 and compression spring 58 maintains a biasing force on valve 54 tending to hold it closed. With passage 37 closed, chamber 26 is no longer conversant with chamber 24, and the pressure in chamber 24 increases with respect to the pressure in chamber 26 which now assumes atmospheric pressure because of vent 57 which is open to the atmosphere. The increase in pressure in chamber 24 increases the force exerted on diaphragm face 34 as liquid continues to enter chamber 24 until the force on face 34 eventually exceeds the combined force exerted on the diaphragm by spring 35 and the pressure in chamber 26 whereupon valve 33 opens as illustrated in FIG. 3. This opens outlet 32 and permits flow of liquid through the separator to meter 14. Because of pressure losses which occur downstream of the air eliminator a head of liquid is maintained in chamber 24 to hold valve 33 open so that liquid flow through the eliminator continues as long as liquid enters chamber 24.

As another air pocket is encountered the supply of liquid to chamber 24 is terminated, or at least reduced below normal, and the level of liquid within that chamber begins to fall. The liquid which had been contained in chamber 24 is forced through outlet 32 by the air which was trapped above the liquid level and partially compressed as the level rose in chamber 24. As the liquid level falls float 48 correspondingly moves downward and eventually, when the liquid reaches a second predetermined level $L_1$, moves valve 54 out of engagement with seat 56 to reopen passage 37 and connect chambers 24 and 26. Again the pressures in chambers 24 and 26 tend to equalize and valve 33 is moved to close outlet 32 and interrupt system flow. It will be noted that, preferably, the control mechanism controls the vent opening for exhausting air as well as the passage between the chambers so that when the passage is closed the vent is also closed to allow pressure to build up in chamber 24 and when passage 37 is opened to equalize the chamber pressures and close valve 33 the vent is also opened to exhaust air entering the eliminator.

With this arrangement, the air eliminator interrupts the system flow when it detects a prescribed amount of air in the system and vents the air to atmosphere thereby preventing passage of any air through the meter 14, and it accomplishes this end with an arrangement which can be used in any system regardless of system pressure and without requiring any adjustment. It will be appreciated that spring 35 could be used alone to effect opening and closing of outlet 32 by selecting the spring force to open and close valve 33 at a desired liquid level. Similarly, the spring could be eliminated and the valve operated only on the basis of the equal pressures acting on unequal surfaces to hold the valve closed and the increased pressure on face 34 being relied upon to open the valve. However, operation on the basis of both equalizing the pressures in the two chambers and using the biasing member is desired since it provides more accurate control and insures opening and closing the valve at precise, desired liquid levels.

It was also discovered that opening 57 should preferably be a restricted opening in the sense that, when chamber 26 is conversant with chamber 24, the exhaust of air from opening 57 will be retarded sufficiently to permit a pressure buildup in chamber 26 and to prevent chamber 26 from immediately exhausting air and remaining at atmospheric pressure. The desirability of using a restricted opening stems from the fact that system pressure, or the pressure within chamber 24, when air is being admitted thereto, may be considerably above atmospheric. If opening 57 were capable of exhausting air at a rate sufficient to maintain chamber 26 at, or near, atmospheric pressure even when air was being admitted into chamber 24 then, rather than have substantially equal pressures in chambers 24 and 26, the pressure in chamber 24 would exceed that in chamber 26 and spring 35 would have to be made sufficiently strong to overcome the differential in pressure which would be created. The shortcoming here would be that spring 35 remains as a factor in the system even when outlet 32 is open and a relatively large spring would create an undue drag in the system and interfere with system flow. By providing a restricted opening 57 the pressures in chambers 24 and 26 tend to equalize and a relatively light spring 35 can be used and no undue drag on the system flow occurs.

Although the use of a restricted, or slow feed, opening for exhausting air is desirable from the above discussed standpoint, it poses another problem with regard to effective operation of the eliminator under all conditions. If only opening 57 were available to exhaust air from the system, an unduly long time would be required to clear the system of any large amounts of air. For example, in a water supply system it may be necessary to clear the system of a large amount of air upon startup and with only a restricted opening available the time required would be unduly prolonged. As a solution to this problem the eliminator of this invention includes a high speed exhaust assembly 60 which does not interfere with normal eliminator operation and only becomes effective when it is necessary to exhaust large quantities of air.

Structurally, high speed exhaust air valve 60 includes an outer housing 62 which is formed by an extension 64 of bonnet 20 and a complimentary extension 66 of central body portion 18. A flexible diaphragm 68 is disposed between extensions 64 and 66 and separates the interior of housing 62 in two chambers 70 and 72. It will be noted that as shown in the drawings diaphragm 68 comprises an extension of main diaphragm 22 but, if desired, could be a separate diaphragm. Chamber 70 is open to chamber 24 through port 74 and, similarly, chamber 72 is open to chamber 26 through port 76. Compression spring 78 is seated between extension 64 and valve member 80 on diaphragm 68, the valve face being rigidly backed by disk 82. Compression spring 78 biases valve face 80 away from seat 84a associated with relief opening 84 and projection 86 is provided in chamber 70 to limit opening movement of valve 80.

With this arrangement the pressures in chambers 70 and 72 correspond respectively to the pressures in chambers 24 and 26. Under normal flow conditions, and with no indication of air in the system so that passage 37 is closed, the pressure in chamber 72 corresponds to that in chamber 26 which is atmospheric whereas the pressure in chamber 70 will correspond to system pressure which is above atmospheric. In this condition port 84 will normally be closed (FIG. 3). Upon entrance of air into the eliminator so that float 48 falls as the level of liquid in the eliminator falls and valve 54 moves to open passage 37, the pressures in chambers 26 and 72 will tend to equalize with that in chambers 24 and 70. With equalization of pressures, the forces exerted by springs 35 and 78 come into play and the spring forces thereof are correlated so that spring 35 will effect a closure of valve member 33 on the outlet at or just below normal system line pressure. Unless an abnormally large amount of air is present in the system the pressures within chambers 24 and 26 with passage 37 open correspond generally to system pressure, or are slightly below system pressure, and the force of spring 35 is selected to effect a closing of valve 33 at that particular pressure whereas the force of spring 78 is selected to effect an opening of its valve member 80 at a pressure which is slightly higher than normal system pressure. If a normal or expected amount of air is present in the line, outlet 32 will be closed and the air will be exhausted through port 57 without relief port 84 being opened. However, if abnormally large amounts of air are present and are being directed through channel 37, orifice 57 is incapable of exhausting this air and a slight buildup in pressure in chambers 26 and 72, as compared to chambers 24 and 70, will occur to increase the force tending to lift valve member 80 from relief opening 84 and this coupled with spring 78 will effect the opening and bring it into operation. The relatively larger relief opening 84 effects a rapid exhaust of air from the system. It will be noted that the high speed relief valve functions without regard to system pressure but operates on the basis of a differential so that the eliminator, with the high speed relief valve, can be used in any system without requiring any adjustments to accommodate a particular system pressure. This then presents the most desirable advantage of permitting the use of an eliminator apparatus in virtually any type of system without regard to the system pressures to be encountered.

Although various valve arrangements and constructions can be used in the eliminator of this invention without departing from either the spirit or scope of the invention the specific valve construction illustrated is preferred since it presents a relatively simplified arrangement. More specifically and with regard to outlet 32 and valve 30, when outlet 32 is open and valve 54 is moved from its seat 56 to open passage 37 the pressure is equalized in chambers 24 and 26. Equal pressures in chambers 24 and 26 are acting over equal diaphragm areas so that the forces exerted by the pressures alone on opposite sides of the diaphragm are substantially equal and spring 35 can effect closure of valve member 33 on annular seat 33a. After outlet 32 is closed, and so long as passage 37 is open, a condition exists whereby the pressure in chamber 24 acts on a lesser area of diaphragm 22 than in chamber 26 which tends to increase the overall force holding the valve 33 on seat 33a to insure that outlet 32 remains closed as air is being exhausted from the eliminator. Of course when passage 37 is again closed upon entry of liquid into chamber 24 the pressure in chamber 26 again becomes atmospheric and that in chamber 24 increases and eventually opens outlet 32 to permit system flow.

With regard to high speed exhaust valve 60 and assuming relief opening 84 to be closed, when passage 37 is opened and the pressures in chambers 70 and 72 equalize the pressure in chamber 72 is acting on a lesser area of diaphragm 68 than that in chamber 70 by virtue of annular seat 84a covering a portion of the diaphragm. The force of spring 78 can be selected so that it is insufficient to overcome this differential in force and under normal system conditions and expected system pressures in the two chambers relief opening 84 remains closed. When air is present in an amount which cannot be handled through opening 57 alone the pressures in chambers 26 and 72 will tend to increase somewhat above the pressures in chambers 24 and 70, system pressure, and spring 78 is selected to exert a force which is sufficient, when added to a pressure slightly above system pressure, to open valve opening 84 and permit rapid exhaust of air from the eliminator. After the air has been exhausted and passage 37 closes the pressures in chambers 26 and 72 and return to atmospheric and the pressures on the opposite sides of the respective diaphragm and in chambers 24 and 70 increases to open outlet 32 and close relief opening 84 to establish normal system flow and reestablish the eliminator for operation either under normal conditions or to exhaust an excessive amount of air.

The illustrated arrangements are simple and effective and make use of occurring system condition to obtain that result, however, other arrangements could be devised without departing from the spirit or scope of this invention and, therefore, it is not intended that this invention be limited to the specific valve arrangements disclosed.

Although but one embodiment of the present invention has been illustrated and described, it will be apparent to those skilled in the art that various changes and modifications may be made therein without departing from the spirit of the invention or from the scope of the appended claims.

I claim:
1. An eliminator comprising, in combination,
  means defining a first chamber through which flow of fluid in a fluid flow system can be directed,
  means for interrupting fluid flow through said first chamber,
  a first relatively restricted vent from said chamber to the atmosphere ambient said eliminator,
  means for opening said first vent when the liquid in said chamber falls below a predetermined level,
  and high speed vent means including means defining a high speed vent chamber connected with and con- versant with the pressure at said first vent, a second vent at a location operatively downstream of said first vent with respect to said means for opening said first vent from said high speed vent chamber, pressure responsive means exposed to the pressure differential between said first chamber and said high speed vent chamber for closing the second vent responsive to a predetermined differential and biased to open said second vent when the pressure differential between said first chamber and said high speed vent chamber decreases to a predetermined value indicating a relatively large amount of medium flowing to said first vent for exhaust.

2. An eliminator comprising, in combination, first and second chambers in said eliminator, means defining inlet and outlet openings in said first chamber adapted for connection in a liquid transport system so that the liquid flow of said system can be directed through said first chamber, valve means for opening and closing said outlet opening, pressure responsive means conversant with the pressures in both said first and second chambers and connected to and operative to move said valve means to open and close said outlet opening in accordance with the pressure differential between said first and second chambers, means defining a passage connecting said first and second chambers to substantially equalize the pressures in said first and second chambers when open, said pressure responsive means operative to close said outlet opening when said passage is open and to open said outlet opening when said passage is closed, means defining a vent communication with said first chamber, second valve means for opening and closing said passage and said vent, control means for said second valve means disposed in said first chamber and responsive to the amount of liquid in said first chamber, said control means operative when liquid in said first chamber is below a predetermined level to move said second valve means to open said passage and further operative when liquid in said first chamber is above a predetermined level to close said passage and vent, high speed vent means comprising a second vent, means connecting said second vent with said first vent, third valve means for said second vent, and control means conversant with the pressures in said first and second chambers and operative to close said third valve means when a substantial differential in pressures occurs between said first and second chambers and further operative to open said third valve means when the pressure in said second chamber increases a predetermined amount indicating a relatively large amount of a medium being directed to said first vent for exhausting.

3. An eliminator comprising, in combination, a housing, first diaphragm means connected within and defining first and second chambers in said housing with opposite sides of said diaphragm means exposed to the pressure within a respective one of said chambers, means defining inlet and outlet openings in said first chamber and adapted for connection in a liquid transport system so that primary liquid flow of said system can be directed through said first chamber, first valve means connected to and movable with said diaphragm means into and out of closing engagement with said outlet opening, means defining a passage extending between said first and second chambers and rendering said first and second chambers conversant with each other when open so that the pressures in said first and second chambers are substantially equalized when said passage is open, means connected to said first valve means and applying an effective force thereon in a closing direction with respect to said outlet opening, means defining a first vent to the atmosphere ambient said housing and communicating with said first chamber through said passage, said first vent being conversant with said second chamber and characterized by a restricted size which retards flow of a medium therethrough, second valve means, float means connected to and operative to move said second valve means to open and close said first vent and passage means simultaneously, means supporting said float means in said first chamber to assume a first position, when primary liquid in said first chamber is below a predetermined level, holding said second valve means open to open said first vent and said passage to render said first and second passages conversant whereupon said first valve means closes said outlet opening to system flow and further supporting said float means for movement, when primary liquid in said first chamber rises above said predetermined level, from said first position to move said second valve to a closed position whereupon the pressure in said first chamber increases with respect to that in said second chamber and said first valve means opens to open said outlet to system flow, means defining a second vent on the second chamber side of said second valve means and conversant with said second chamber, and pressure responsive means exposed to the pressures in said first and second chambers and operative to close said second vent when the pressure in said first chamber is relatively higher than that in said second chamber, and means to open said second vent when the pressure in said second chamber increases a predetermined amount indicating a relatively large amount of secondary medium flowing through said passage to be exhausted from the eliminator so that said second vent is available to assist in venting said relatively large amount of secondary medium.

4. The eliminator of claim 3 wherein said responsive means comprises second diaphragm means having opposite faces which are exposed to the pressures in respective ones of said first and second chambers, valve means connected to and movable with said second diaphragm means to open and close said second vent, and biasing means connected to said second diaphragm means and arranged with respect thereto to cooperate with the pressure differential across said second diaphragm means to open said second vent when said predetermined pressure increase occurs in said second chamber indicating a relatively large amount of secondary medium flowing through said passage to be exhausted.

5. The eliminator of claim 4 wherein said second biasing means acts in a direction to open said second valve and wherein the biasing force of said first biasing means is greater than that of said second biasing means.

6. The eliminator of claim 4 wherein said second vent is relatively larger than said first vent.

7. An eliminator comprising, in combination, means defining first and second chambers, means defining inlet and outlet openings in said first chamber and adapted for connection in a liquid transport system so that the liquid flow of said system can be directed through said first chamber, first diaphragm means connected to said first and second chambers with the opposite sides thereof exposed to the pressure in a respective one of said chambers, means defining a passage connecting said first and second chambers and rendering said first and second chambers conversant with each other when opened to substantially equalize the pressures in said first and second chambers, valve means including an annular valve seat associated with said outlet opening and a valve member connected to and covering a portion of the face of said first diaphragm means exposed to said first chamber so that when closed on said valve seat the area of said first diaphragm means exposed to said first chamber is less than the area of said diaphragm means exposed to said second chamber, said valve member being movable into and out of engagement with said valve seat in accordance with movement of said diaphragm means and said diaphragm means and valve member being arranged to assume a position closing said outlet opening when said passage means is open, means defining a first vent opening from said second chamber to atmosphere ambient said eliminator, second valve means, float means within said first chamber and connected to and operative to move said second valve to open and close said passage, means supporting said float means in said first chamber to assume a first position, when liquid in said first chamber is below a predetermined level, holding said second valve means open to open said passage and substantially equalize the pressures in said first and second chambers and also supporting said float means for movement, when liquid in said first chamber is above said predetermined level, from said first position to move said second valve means to close said passage and produce a pressure differential between said first and second chambers with said diaphragm means and first valve means moving to open said outlet opening, second diaphragm means having opposite faces exposed to the pressure in a respective one of said first and second chambers, a second vent to said ambient and conversant with said second chamber through a generally annular valve seat, and third valve means connected to and movable with said second diaphragm means in accordance with the differential in pressure between said first and second chambers to open and close on the valve seat of said second seat.

8. The combination of claim 7 including first and second biasing means engaging both said diaphragm means and biasing said diaphragm means against the pressure in said first chamber.

9. The air eliminator of claim 2 wherein said first vent opens from said second chamber to the atmosphere ambient said eliminator so that when said passage is closed said second chamber assumes ambient pressure and said first vent being characterized by a predetermined restricted size which retards the exhaust of said medium therethrough so that a delay occurs in said second chamber assuming said ambient pressure and wherein said second vent has a relatively larger size than said first vent.

References Cited

UNITED STATES PATENTS

| | | | |
|---|---|---|---|
| 2,103,020 | 12/1937 | Saarinen | 73—200 X |
| 2,329,323 | 9/1943 | Benz | 137—173 X |
| 2,949,925 | 8/1960 | Everett | 137—195 |
| 2,997,053 | 8/1961 | Walker | 137—202 |
| 3,236,493 | 2/1966 | Richards | 137—202 X |

ALAN COHAN, *Primary Examiner.*

U.S. Cl. X.R.

137—195

UNITED STATES PATENT OFFICE
CERTIFICATE OF CORRECTION

Patent No. 3,419,035 December 31, 1968

Marvin E. Hartz

It is certified that error appears in the above identified patent and that said Letters Patent are hereby corrected as shown below:

Column 7, lines 2 to 4, cancel "at a location operatively downstream of said first vent with respect to said means for opening said first vent" and insert the same after "vent" in line 1, same column 7; same column 7, line 34, "communication" should read -- communicating --. Column 8, lines 29 and 66, after "valve", each occurrence, insert -- means --.

Signed and sealed this 24th day of March 1970.

(SEAL)
Attest:

Edward M. Fletcher, Jr.
Attesting Officer

WILLIAM E. SCHUYLER, JR.
Commissioner of Patents